United States Patent [19]

Salapow et al.

[11] Patent Number: 5,531,803
[45] Date of Patent: Jul. 2, 1996

[54] METAL COVER FOR RESPIRATOR CARTRIDGE

[75] Inventors: Thomas M. Salapow, Pittsburgh; Roger P. Wolf, Butler; Thomas J. Scanio, Verona; John F. Kuhn, Wexford, all of Pa.

[73] Assignee: Mine Safety Appliances Company, Pittsburgh, Pa.

[21] Appl. No.: 327,198

[22] Filed: Oct. 21, 1994

[51] Int. Cl.⁶ .................................................. B01D 46/00
[52] U.S. Cl. ........................ 55/498; 55/502; 55/DIG. 33; 55/DIG. 35
[58] Field of Search ............................ 55/497, 498, 502, 55/DIG. 33, DIG. 35

[56] References Cited

U.S. PATENT DOCUMENTS

| | | | |
|---|---|---|---|
| 4,548,626 | 10/1985 | Ackley et al. ...................... | 55/DIG. 35 |
| 4,714,486 | 12/1987 | Silverthorn ................................ | 55/502 |
| 5,022,901 | 6/1991 | Meunier ..................................... | 55/502 |
| 5,062,874 | 11/1991 | Legare et al. ............................. | 55/502 |
| 5,063,926 | 11/1991 | Forsgren et al. ..................... | 55/DIG. 33 |
| 5,158,077 | 10/1992 | Sundstrom ........................ | 55/DIG. 35 |

FOREIGN PATENT DOCUMENTS 2254016 9/1992 United Kingdom ............. 55/DIG. 33

*Primary Examiner*—C. Scott Bushey
*Attorney, Agent, or Firm*—James G. Uber; George E. Manias

[57] ABSTRACT

A metal respirator cartridge which may be completely assembled prior to performing the encapsulation process wherein the periphery of the filter element is completely sealed to the metal cartridge body. The cartridge has a metal cover provided with a unique air inlet opening which performs two distinct functions, that is, as an opening to admit air into the metal respirator cartridge as is normal; and as an opening which, during the manufacturing process, allows a liquid sealant to be introduced into the interior of the metal cartridge body to encapsulate the periphery of the filter element.

16 Claims, 6 Drawing Sheets

METAL COVER FOR RESPIRATOR CARTRIDGE

BACKGROUND OF THE INVENTION

1. Field of the Invention

This invention relates to a metal respirator cartridge of the type containing a particulate filter, and more particularly to a metal cover allowing the periphery of the particulate filter to be sealed to the cartridge body.

2. Description of the Prior Art

An essential step in the manufacture of a respirator cartridge, whether it is a filter cartridge or a combination chemical/particulate filter cartridge, is the encapsulation of the filter. That is the periphery of the filter is sealed against the metal cartridge body by means of a liquid sealant, such as, a two-component urethane compound which hardens as it cures. The peripheral sealing is necessary to ensure that air flowing through the cartridge, actually flows through the filter and does not bypass the filter.

Heretofore, the encapsulation of filters in metal cartridge bodies, was accomplished by means of a silicone mold or boot which was used during the encapsulating process and prior to final assembly of the cartridge. Typically, a particulate filter is placed in the metal cartridge body followed by the silicone boot. The silicone boot sits in the cartridge body and serves to control the height of the sealant wall formed at the periphery of the filter and, most importantly, to confine the sealant within the cartridge. Thereafter the cartridge/boot combination is rotated at at least 500 rpm and liquid sealant is then dispensed into the boot. The centrifugal forces created during the high speed rotation of the cartridge/boot combination, cause the liquid sealant to flow inwardly of the boot and outwardly to the periphery of the particulate filter to form a sealant wall of substantially uniform thickness between the inner wall of the cartridge body and an outer portion of the filter. After the sealant sets or hardens, spinning is stopped, the boot is removed and assembly of the cartridge continues.

From start to finish, the process of encapsulating and assembling each metal respirator cartridge, is longer than desirable, is considerably messy, and more costly. It has been found that after twenty (20) to twenty-five (25) uses, the silicone boot becomes unusable due to the accumulation of excess sealant and other debris. Since cleaning the boot is a time consuming and uneconomical operation, the boot typically is discarded and a new boot is used in encapsulating the next series of cartridges.

SUMMARY OF THE INVENTION

A principal object of this invention is to provide a relatively inexpensive method for encapsulating a filter element and assembling a filter cartridge.

Another object of this invention is to encapsulate a filter element within a metal respirator body, without the aid of any tools, such as a silicone boot.

Still another object of this invention is to provide a respirator cartridge, whether it is a filter cartridge or a combination chemical/particulate filter cartridge, that can be completely assembled prior to encapsulating the filter element.

A still further object of the invention is to provide a novel top wall for a metal respirator cartridge having a unique air inlet opening pattern that allows a liquid sealant to be introduced while preventing the liquid sealant from accumulating on the outside of the cartridge or from flowing outside of the cartridge and onto adjacent equipment and parts.

In accordance with this invention, a metal respirator cartridge is provided which includes a metal cartridge body having a peripheral wall and a perforated bottom wall; a filter element disposed within the metal cartridge body; and a metal cover connected to the metal cartridge body. The metal cover comprises: a cover portion having a central opening with an annular rim; a top wall having an outer edge spaced apart from the annular rim; an air inlet opening presented between the outer edge of the top wall and the annular rim; a support keeping the top wall at a level between the annular rim and the filter element. The support can be connected between the top wall and the annular rim.

The overall arrangement is such that the metal cover is assembled onto the cartridge body containing the filter element prior to the encapsulating process. Thereafter, the cartridge assembly is rotated at at least 500 rpm and the liquid sealant is dispensed onto the top wall. Centrifugal forces cause the liquid sealant to flow through the air inlet opening and to form a sealant wall of substantially uniform thickness along the inner surface of the wall of the cartridge body.

Further in accordance with the preferred embodiment of the present invention, the support comprises a metal strip extending between and connected in sine-wave fashion alternately to the annular rim and to the outer edge of said top wall.

In accordance with an alternative embodiment of the present invention, the metal cover is of a two-piece design wherein the top wall is separate from the metal cover and the support comprises a plurality of arms radiating outwardly from said outer edge of the top wall into engagement with the metal cartridge body.

These and other objects and advantages of the present invention will become apparent from the following detailed description with reference to the accompanying drawings in which:

DESCRIPTION OF THE PRESENTLY PREFERRED EMBODIMENTS

Figure 1:
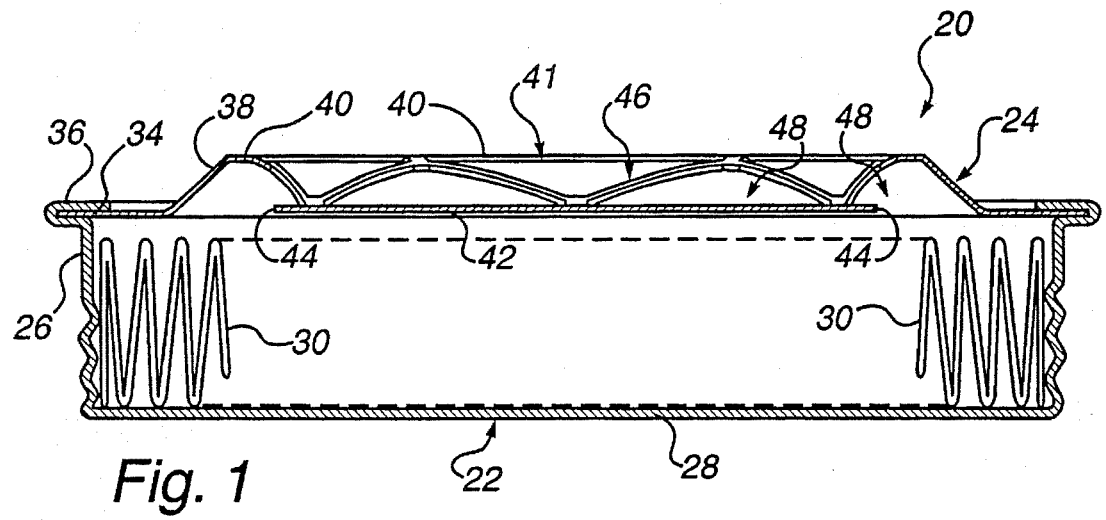
FIG. 1 is a cross-sectional view, taken along the line 1—1 of FIG. 2 illustrating a metal respirator cartridge prior to encapsulation of a pleated filter.
Figure 2:
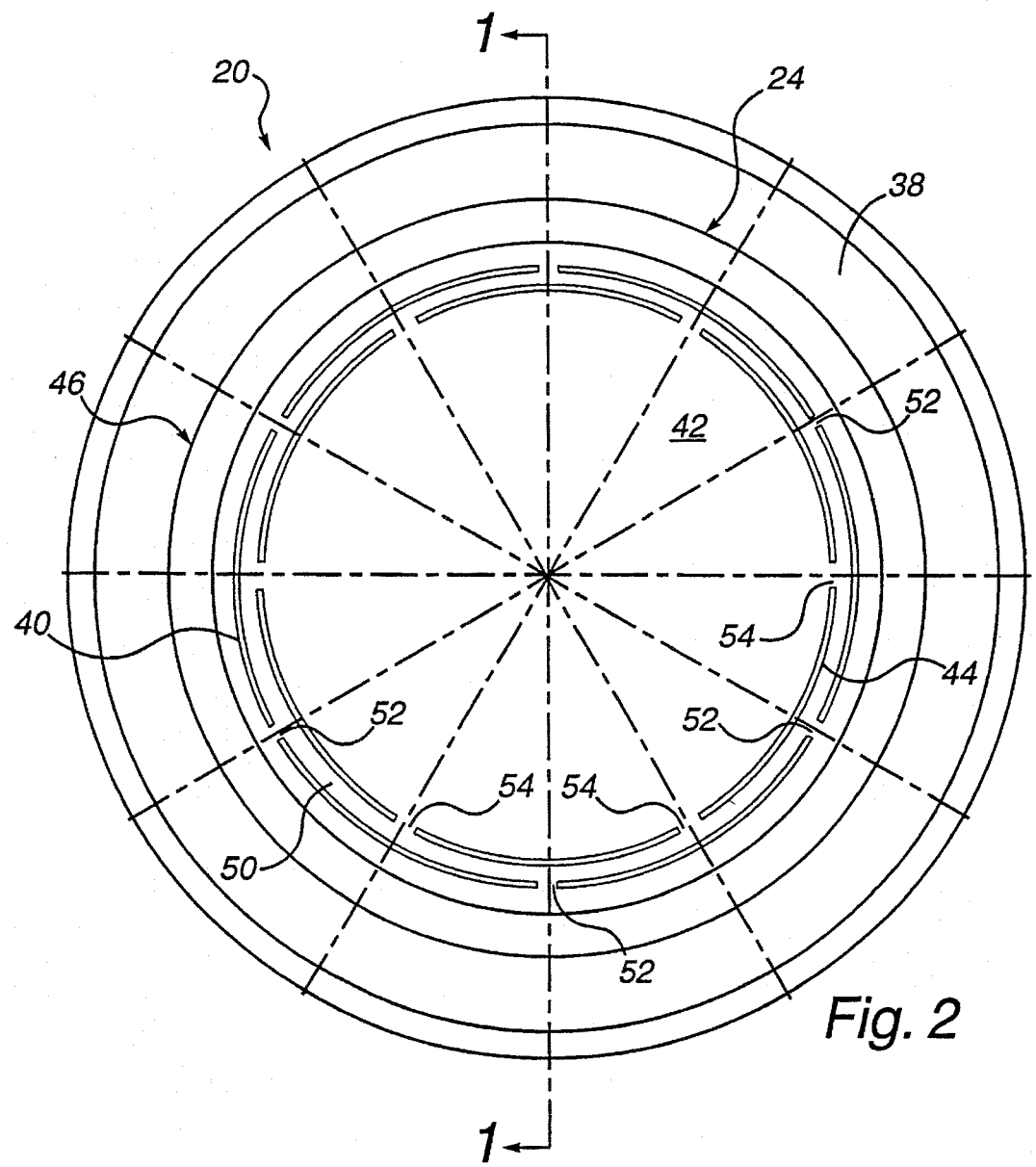
FIG. 2 is a plan view of a metal respirator cartridge incorporating the metal cover of this invention.
Figure 3:
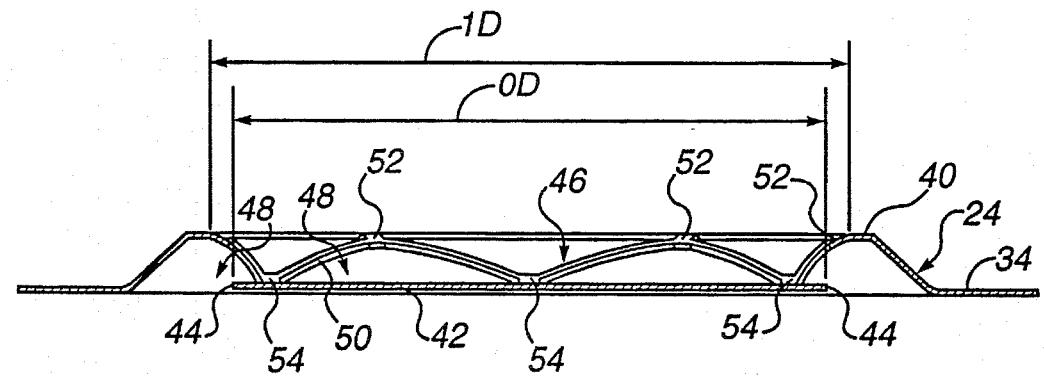
FIG. 3 is a transverse cross-sectional view of the metal cover used in a respirator cartridge of this invention.

Referring to FIGS. 1, 2 and 3, there is illustrated a filter cartridge 20 including a metal cartridge body 22 and a metal cover 24. The metal cartridge body 22 and the metal cover 24 are preferably formed from a sheet of metal, such as aluminum or steel. The metal cartridge body 22 comprises a threaded peripheral wall 26 and a perforated bottom wall 28 (perforations not illustrated) through which air exits from the filter cartridge 20. The filter cartridge 20 preferably incorporates a high efficiency particulate filter 30, preferably pleated, which substantially fills the metal cartridge body 22. The filter cartridge 20 is completely assembled preparatory to undergoing the encapsulation process.

The metal cover 24 has a peripheral edge 34 which is secured to the cartridge body 22 by the crimped over edge 36 of the peripheral wall 26. The metal cover 24 preferably includes a frusto-conical wall 38 which projects upwardly from the peripheral edge 34 and terminates in an inwardly extending annular rim 40. The edge of the rim 40 defines a central opening 41. The metal cover 24 presents a top wall 42 having an outer edge 44 which is spaced apart from the annular rim 40. As best shown in FIG. 3, the arrangement is such that the top wall 42 has an outer diameter indicated by the dimension line labeled OD which is less than the inside diameter of the annular rim 40 as indicated by the dimension line labeled ID.

A support 46 is provided which connects the top wall 42 to the annular rim 40, keeps the top wall 42 centered with respect to the metal cover 24, and at a level between the annular rim 40 and the pleated filter 30. As a result, an air inlet opening 48 is provided between the outer edge 44 of the top wall 42 and the annular rim 40.

As can be seen in FIGS. 2 and 3, the support 46 preferably comprises a continuous metal strip 50 which is a portion of the sheet metal from which the metal cover 24 is formed. The metal strip 50 extends between and is connected in sine-wave fashion to the annular rim 40 by segments 52 and to the outer edge 44 of the top wall 42 by segments 54. The metal cover 24 is formed from a flat sheet of metal preferably in a punch press or a transfer stamping operation in which the metal sheet is drawn to form the frusto-conical wall 38 and is lanced and pressed to form the continuous metal strip 50 and the top wall 42.

Figure 4:
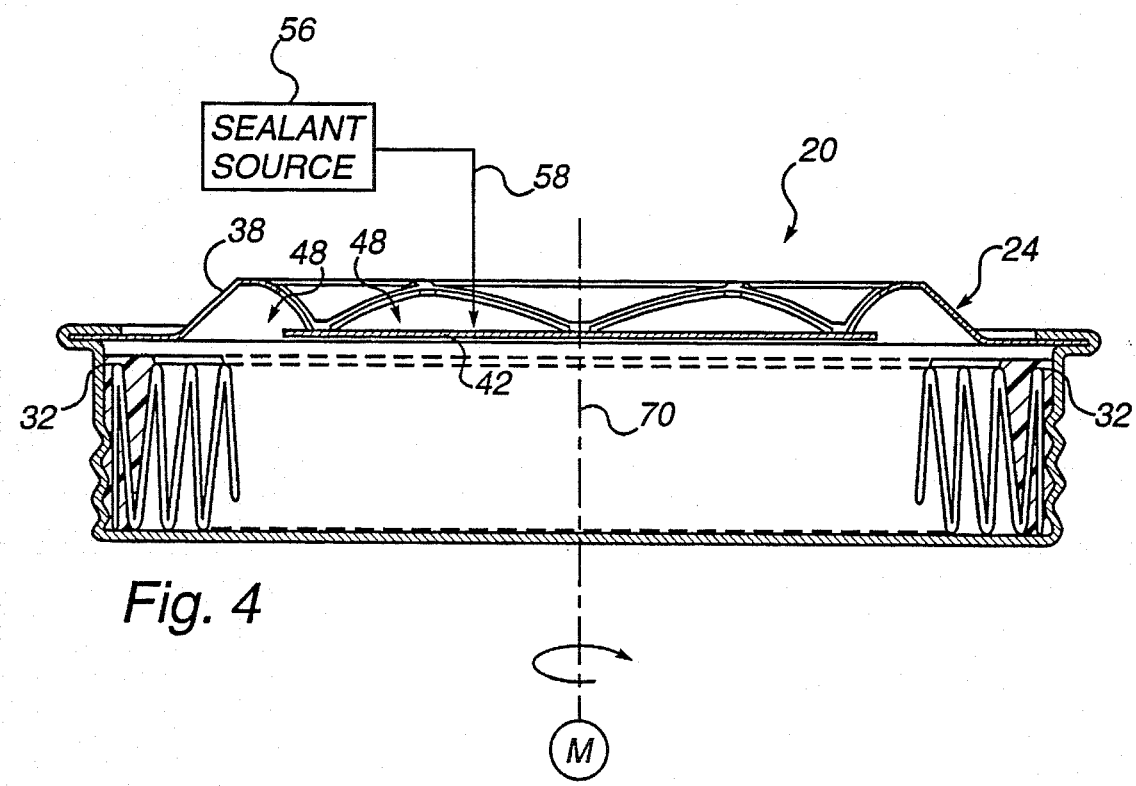
FIG. 4 is a cross-sectional view, similar to FIG. 1, illustrating the encapsulation process.

Referring to FIG. 4, the filter cartridge 20 is supported for high-speed rotation by motor M or other suitable drive mechanism. The filter cartridge 20 spins at at least 500 rpm and preferably at 1,000 to 1,500 rpm. An appropriate quantity of a liquid sealant 58 is dispensed from a sealant source 56, onto the top wall 42. Since the filter cartridge 20 is rotating at high speed, centrifugal forces are generated that cause the sealant 58 to flow outwardly through the air inlet opening 48, into contact with the interior surface of the frusto-conical wall 38 and then to the interior of the metal cartridge body 22. The sealant 58 sets, cures, and hardens to form the substantially uniform sealant layer 32. Thus the filter cartridge 20 is completely assembled prior to the encapsulation process.

It will therefore be appreciated that the present invention provides a novel metal cover incorporating an air inlet opening of unique design. That is, the air inlet opening 48 performs two functions. Firstly, it provides an opening through which air enters into the filter cartridge 20 when the cartridge 20 is in use. Secondly, it provides an opening through which the liquid sealant 58 can be introduced into the interior of the metal cartridge body 22 to form the substantially uniform sealant layer 32 without allowing the liquid sealant 58 to become splattered or accumulated on the outside of the cartridge 20 or to fly off of the filter cartridge 20 onto any surrounding parts and/or equipment during the encapsulation process.

Figure 5:
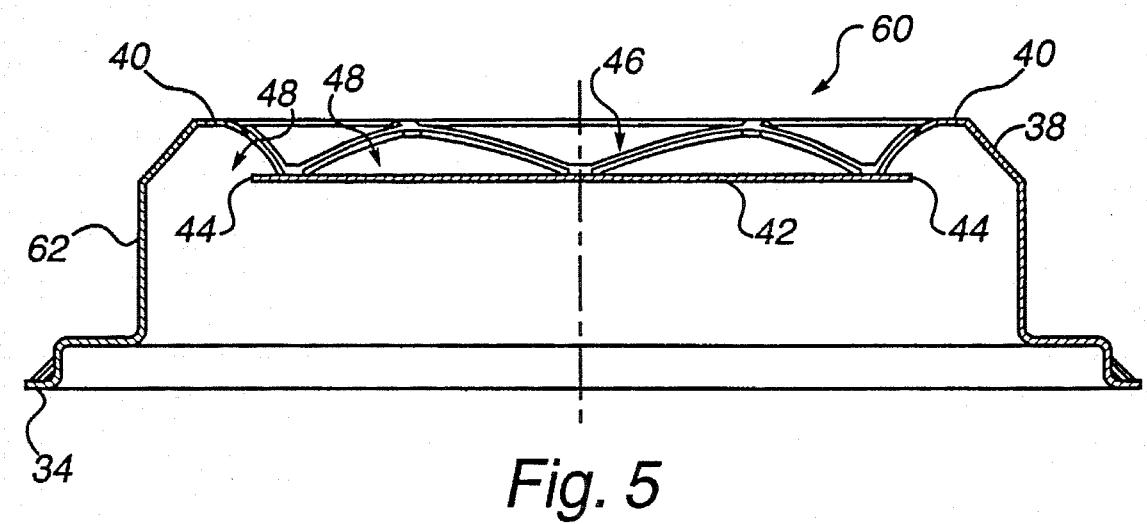
FIG. 5 is a transverse cross-sectional view, similar to FIG. 3, illustrating an alternative metal cover used in a combination chemical/particulate respirator cartridge.
Figure 8:
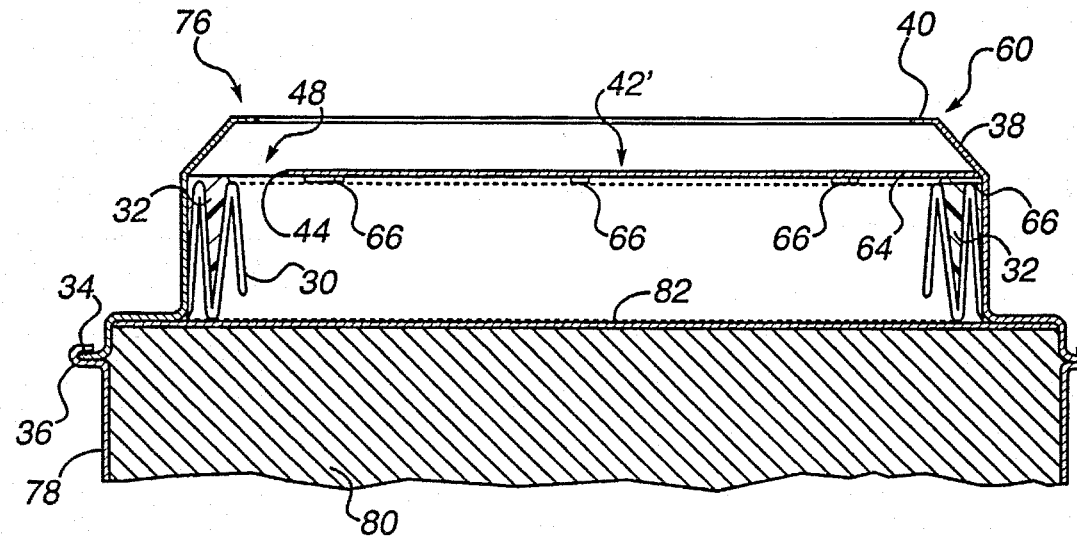
FIG. 8 is a cross-sectional view, taken along the line 8—8 of FIG. 9, illustrating a combination chemical/particulate respirator cartridge incorporating the alternative top wall of FIG. 6.

FIG. 5 illustrates an alternative metal cover 60 wherein corresponding numerals have been used to identify corresponding parts heretofore described. The metal cover 60 is used in a combination chemical/particulate filter cartridge which preferably incorporates a high efficiency particulate filter and a layer of chemicals used to adsorb noxious vapors and unwanted gaseous elements. The peripheral edge 34 of the metal cover 60, as shown in FIG. 8, is secured to a cannister body by the crimped over edge 36. The metal cover 60 additionally includes a cylindrical wall 62 which will contain the pleated particulate filter media. The metal cover 60 additionally includes the frusto-conical wall 38 which terminates in an inwardly extending annular rim 40. A top wall 42 is positioned beneath the annular rim 40 and is connected thereto by support 46. FIG. 5 is intended to illustrate that an air inlet opening 48 may be provided in the metal cover 60 in the same manner as described above in connection with FIG. 1–3.

Figure 6:
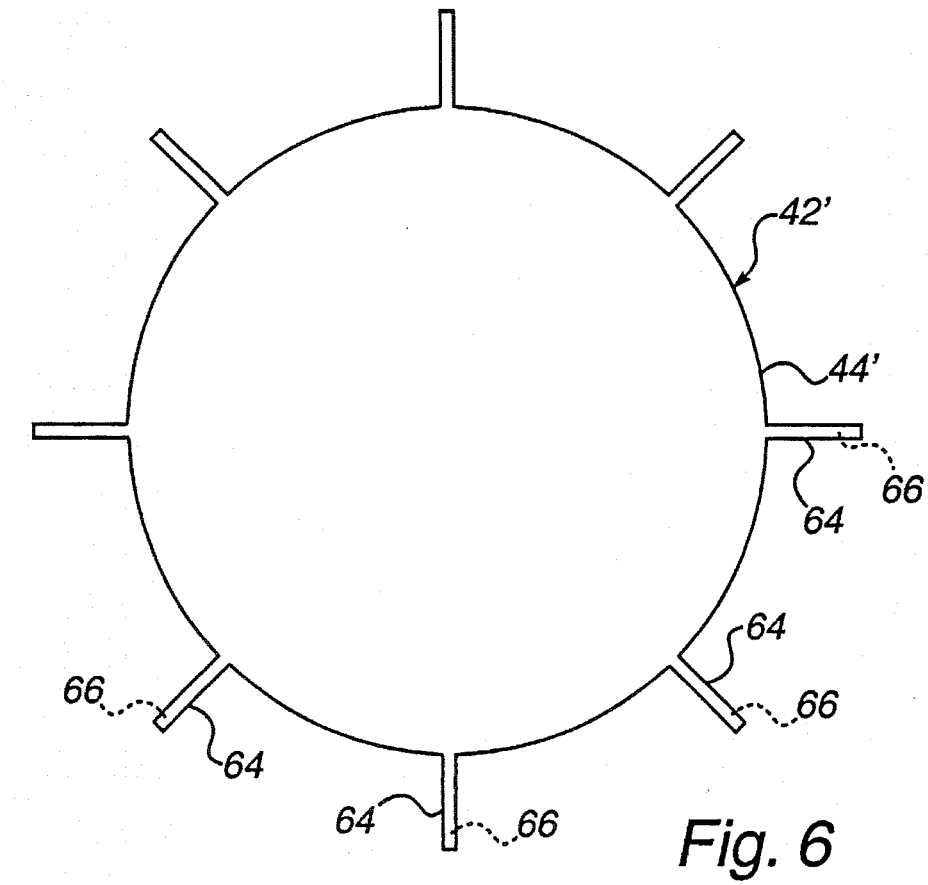
FIG. 6 is a plan view of an alternative embodiment of the top wall shown as a separate element.

FIG. 6 illustrates an alternative embodiment wherein a top wall 42' is formed as a separate element rather than being formed integrally with the metal cover. The top wall 42' includes a plurality of arms 64 which radiate outwardly from the outer edge 44' of the top wall 42'. Preferably, each of the arms 64 terminates in a reverse bent portion 66 serving as a spacer element as will be described.

Figure 7:
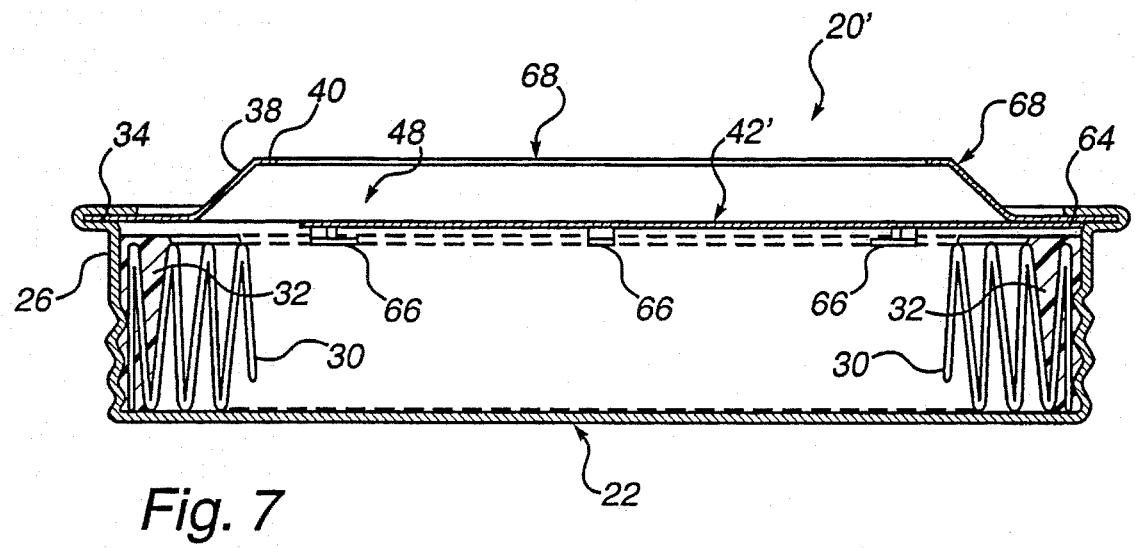
FIG. 7 is a cross-sectional view, similar to FIG. 4, illustrating a metal respirator cartridge incorporating the alternative top wall of FIG. 6.

FIG. 7 illustrates a filter cartridge 20' which comprises a metal cartridge body 22 containing a pleated filter 30, and a metal cover 68. The metal cover 68 includes the peripheral edge 34 and the frusto-conical wall 38 which terminates in the annular rim 40. In this embodiment, the separate top wall 42' is positioned between the metal cover 68 and the pleated filter 30. The arms 64 extend outwardly and engage the cartridge body 26 thereby maintaining the top wall 42' centered with respect to the metal cover 68 and at a level between the annular rim 40 and the pleated filter 30. Again, the arrangement provides the air inlet opening 48 which during manufacture allows the introduction of the liquid sealant to form the encapsulating layer 32 of hardened sealant.

Figure 9:
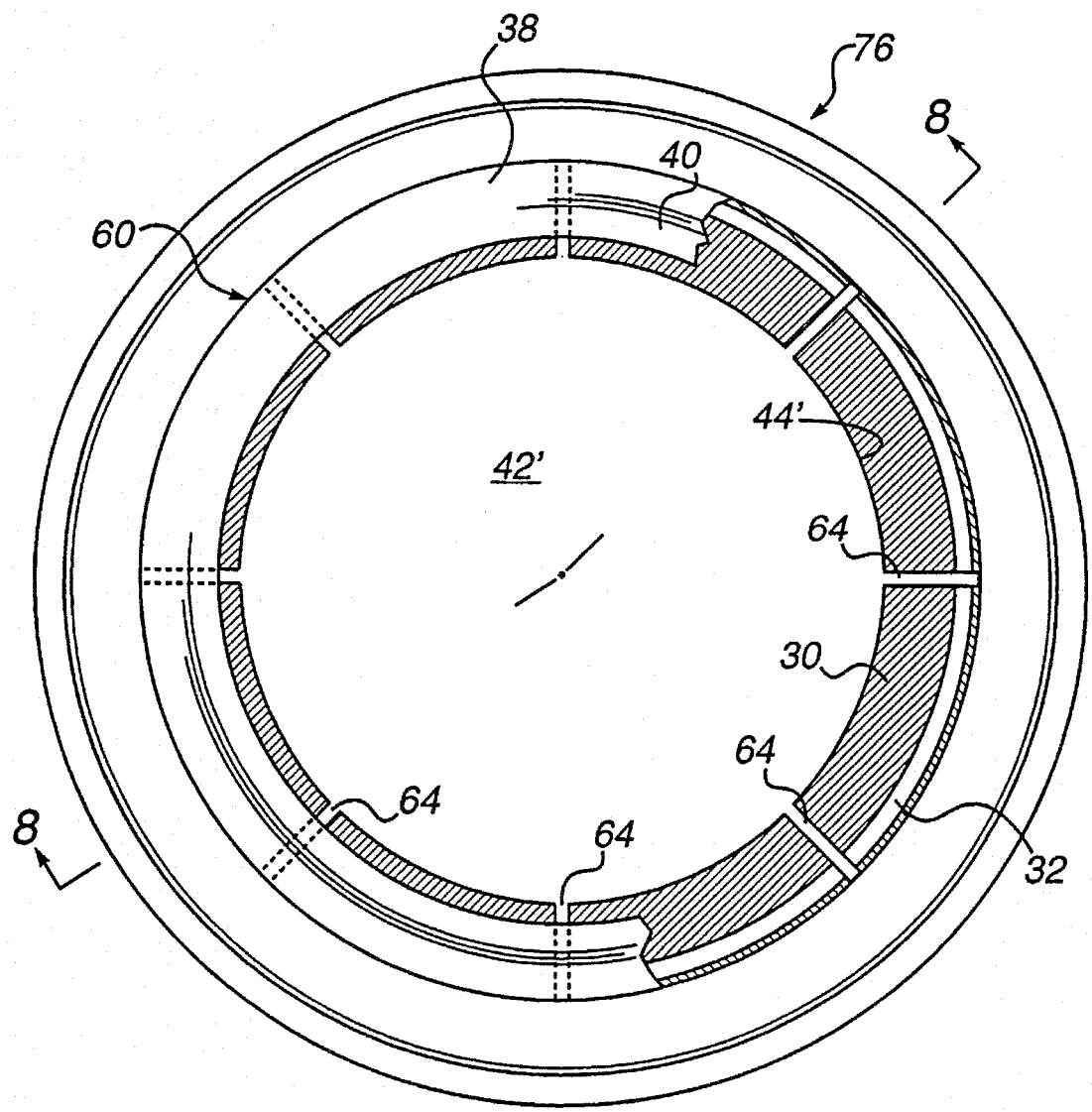
FIG. 9 is a plan view, partly in cross-section, of the combination chemical/particulate respirator cartridge of FIG. 8.

Referring to FIGS. 8 and 9, there is illustrated a combination chemical/particulate filter cartridge 76 including a metal cartridge body 78 to which is secured the metal cover 60. The metal cartridge body 78 contains a chemical layer 80, such as, those described in U.S. Pat. No. 5,063,196 and PCT Application No. PCT/US92/10216 which has been assigned International Publication No. WO 93/10896. A perforated support plate 82 (perforations not illustrated) is provided above the chemical layer 80 to support the pleated filter 30 contained within the metal cover 60. In this embodiment, the top wall 42' is positioned between the annular rim 40 and the pleated filter 30. As best shown in FIG. 8, the arms 64 engage the frusto-conical wall 38 and serve to center the top wall 42' with respect to the metal cover 60. The reverse bent portions 66 maintain positioning of the top wall 42' with respect to the metal cover 60. The reverse bent portions 66 also maintain the top wall 42' spaced apart from the pleated filter 30. As in prior embodiments, the air inlet opening 48 allows the introduction of the liquid sealant so as to form the substantially uniform hardened layer 32 which seals the periphery of the particulate filter 30. That is, the liquid sealant is introduced without permitting the liquid sealant to become splattered or accumulated on the outside of the cartridge 20 or from flowing outside of the cartridge 20 and onto adjacent equipment and parts.

Figure 10:
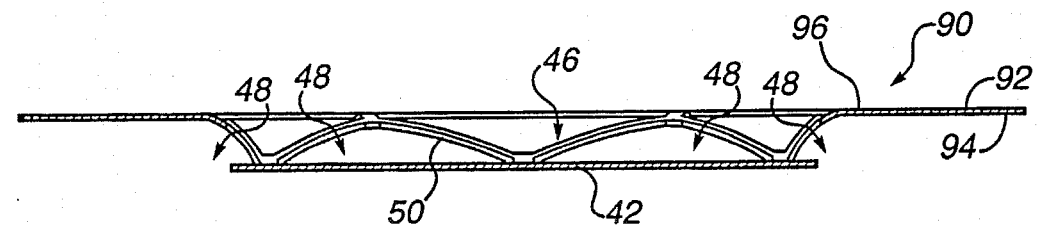
FIG. 10 is a transverse cross-sectional view, similar to FIG. 3, illustrating an alternative embodiment of the metal cover used in a respirator cartridge of this invention.
Figure 11:
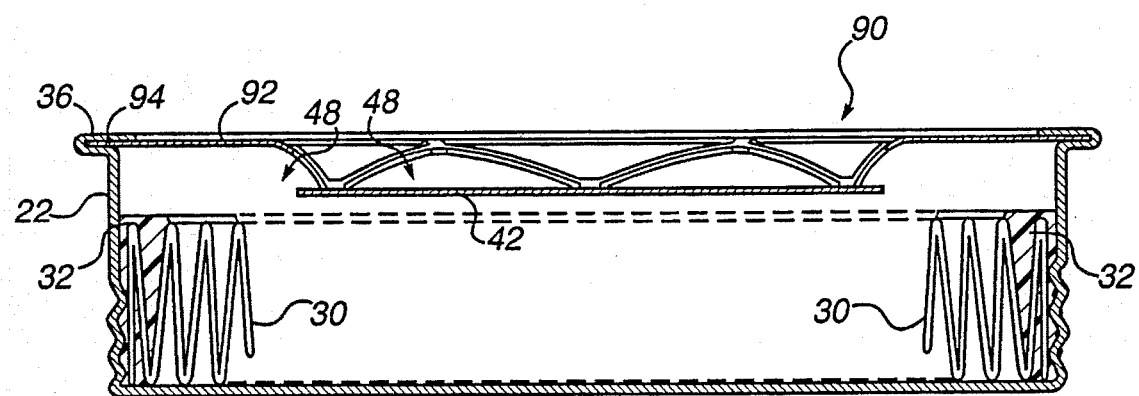
FIG. 11 is a cross-sectional view, similar to FIG. 4, illustrating a metal respirator cartridge incorporating the alternative top wall of FIG. 10.

FIG. 10 illustrates a metal cover 90 which comprises a flat metal sheet 92 having an outer edge portion 94 and an inner annular rim 96. The metal cover 90 is provided with the top wall 42 which is connected to the annular rim 96 by the continuous metal strip 50 of the support 46. The top wall 42 and the support 46 are formed in the manner described above, that is, by punch press or a transfer stamping operation in which the metal sheet 92 is lanced and pressed to form the continuous metal strip 50 and the top wall 42. FIG. 11 illustrates a metal respirator cartridge 100 wherein the outer edge portion 94 of the metal cover 90 is connected to the metal cartridge body 22 by the crimped over edge 36. The substantially uniform sealant layer 32 at the periphery of the particulate filter 30 is formed in the manner described above. That is, by utilizing the air inlet opening 48 to introduce the liquid sealant which ultimately hardens, as it cures, to form the sealant layer 32.

Figure 12:
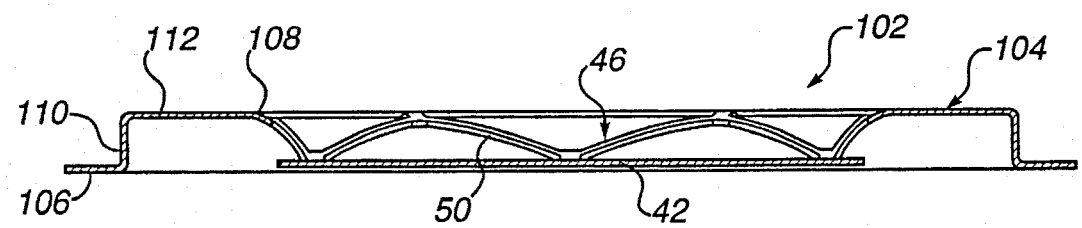
FIG. 12 is a transverse cross-sectional view, similar to FIG. 3, showing a further alternative embodiment of the metal cover used in a respirator cartridge of this invention.
Figure 13:
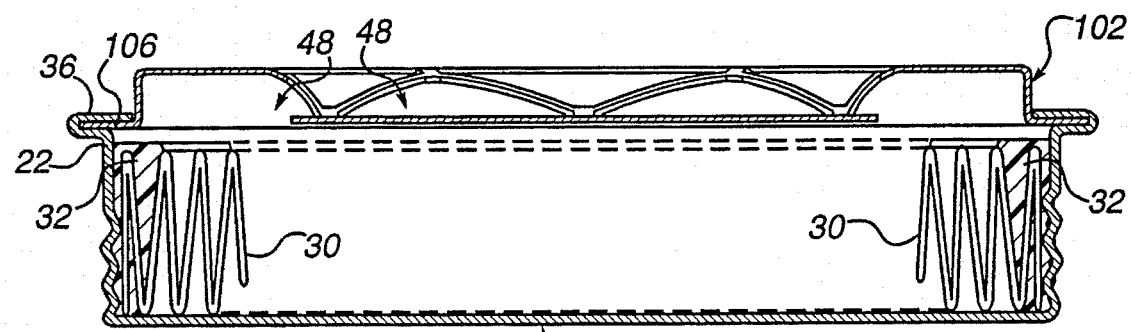
FIG. 13 is a cross-sectional view, similar to FIG. 4, illustrating a metal respirator cartridge incorporating the alternative top wall of FIG. 12.

FIG. 12 illustrates a metal cover 102 which is formed from the flat metal sheet 104 to have an outer edge portion 106 and an inner annular rim 108. The metal cover 102 additionally includes a depending peripheral wall 110 connecting the outer edge portion 106 to an upper wall 112. The metal cover 102 is provided with the top wall 42 which is connected to the annular rim 108 by the continuous metal strip 50 of the support 46. The top wall 42 and the support 46 are formed in the manner described above, that is, by punch press or a transfer stamping operation in which the metal sheet 104 is drawn to form the depending peripheral wall 110 and is lanced and pressed to form the continuous metal strip 50 and the top wall 42. FIG. 13 illustrates a metal respirator cartridge 114 wherein the metal cover 102 is connected to the metal cartridge body 22 by the crimped over edge 36. The substantially uniform sealant layer 32 at the periphery of the particulate filter 30 is formed in the manner described above. That is, by utilizing the air inlet opening 48 to introduce the liquid sealant which ultimately hardens, as it cures, to form the sealant layer 32.

While presently preferred embodiments of practicing the invention have been shown and described with particularity in connection with the accompanying drawings, the invention may otherwise be embodied within the scope of the following claims.

We claim:

1. A metal respirator cartridge including:
   a metal cartridge body having a threaded peripheral wall and a perforated bottom wall;
   a filter disposed within said metal cartridge body;
   a unitary metal cover formed from a flat sheet of metal and connected to said metal cartridge body, said metal cover comprising:
      a central opening having an annular rim;
      a top wall having an outer edge spaced apart from said annular rim;
      an air inlet opening presented between said outer edge of said top wall and said rim; and
      a support connecting said top wall to said annular rim and keeping said top wall at a level between said annular rim and said filter.

2. The metal respirator cartridge as defined in claim 1 wherein said top wall is circular in shape.

3. The metal respirator cartridge as defined in claim 2 wherein said top wall has an outer diameter that is less than the inner diameter of said annular rim.

4. The metal respirator cartridge as defined in claim 1 wherein said support comprises a metal strip having a sine-wave configuration and which extends between and is connected alternately to said annular rim and to said outer edge of said top wall.

5. The metal respirator cartridge as defined in claim 4 wherein said metal strip comprises a portion of said metal cover.

6. The metal respirator cartridge as defined in claim 1 wherein said metal cover includes a frusto-conical wall projecting away from said metal body and terminating in said annular rim.

7. The metal respirator cartridge as defined in claim 1 wherein said metal cover comprises a flat metal sheet having an outer edge portion connected to said metal cartridge body.

8. The metal respirator cartridge as defined in claim 7 wherein said flat metal sheet includes a depending peripheral wall terminating in said outer edge portion.

9. The metal respirator cartridge as defined in claim 1 wherein said top wall is centered with respect to said metal cover.

10. The metal respirator cartridge as defined in claim 1 including a layer of sealant material sealing the space between the periphery of said filter and said metal cartridge body.

11. A metal respirator cartridge including:
   a metal cartridge body having a threaded peripheral wall and a perforated bottom wall;
   a filter disposed within said metal cartridge body;
   a metal cover connected to said metal cartridge body, said metal cover comprising:
      a cover portion having a central opening presenting an annular rim;
      a top wall having an outer edge spaced apart from said annular rim;
      an air inlet opening presented between said outer edge and said annular rim; and
      a support keeping said top wall at a level between said annular rim and said filter, the support comprising a plurality of arms radiating outwardly from said outer edge of said top wall, beneath said metal cover, and engaged with said metal body, and a plurality of the arms having a downturned end portion engaging said pleated filter.

12. The metal respirator cartridge as defined in claim 11 wherein said cover portion includes a frusto-conical wall projecting away from said metal body and terminating in said annular rim.

13. The metal respirator cartridge as defined in claim 11 wherein said metal cover comprises a flat metal sheet having an outer edge portion connected to said metal cartridge body.

14. The metal respirator cartridge as defined in claim 13 wherein said flat metal sheet includes a depending peripheral wall terminating in said outer edge portion.

15. The metal respirator cartridge as defined in claim 11 wherein said top wall is centered with respect to said metal cover.

16. The metal respirator cartridge as defined in claim 11 including a layer of sealant material sealing the space between the periphery of said filter and said metal cartridge body.

* * * * *